US009676931B2

(12) United States Patent
Senga et al.

(10) Patent No.: US 9,676,931 B2
(45) Date of Patent: Jun. 13, 2017

(54) POLYMER COMPOSITION, CROSSLINKED POLYMER, TIRE, AND POLYMER

(71) Applicant: JSR CORPORATION, Minato-ku (JP)

(72) Inventors: Hirofumi Senga, Minato-ku (JP); Naoya Nosaka, Minato-ku (JP); Shigeru Abe, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 0 days.

(21) Appl. No.: 14/768,374

(22) PCT Filed: May 13, 2014

(86) PCT No.: PCT/JP2014/062692
§ 371 (c)(1),
(2) Date: Aug. 17, 2015

(87) PCT Pub. No.: WO2014/185398
PCT Pub. Date: Nov. 20, 2014

(65) Prior Publication Data
US 2016/0009911 A1    Jan. 14, 2016

(30) Foreign Application Priority Data

May 13, 2013   (JP) ................. 2013-101415

(51) Int. Cl.
| | |
|---|---|
| C08L 33/02 | (2006.01) |
| B60C 1/00 | (2006.01) |
| C08C 19/22 | (2006.01) |
| C08C 19/44 | (2006.01) |
| C08L 15/00 | (2006.01) |
| C08L 25/10 | (2006.01) |
| C08L 101/02 | (2006.01) |
| C08L 101/08 | (2006.01) |
| C08L 9/06 | (2006.01) |

(52) U.S. Cl.
CPC ............ *C08L 33/02* (2013.01); *B60C 1/0016* (2013.04); *B60C 1/0025* (2013.04); *C08C 19/22* (2013.01); *C08C 19/44* (2013.01); *C08L 9/06* (2013.01); *C08L 15/00* (2013.01); *C08L 25/10* (2013.01); *C08L 101/02* (2013.01); *C08L 101/025* (2013.01); *C08L 101/08* (2013.01)

(58) Field of Classification Search
CPC .. C08L 33/02; C08L 9/06; C08L 15/00; C08L 25/10; C08L 101/02; C08L 101/025; C08L 101/08; B60C 1/0016; B60C 1/0025; C08C 19/22; C08C 19/44
USPC ........................................................ 524/522
See application file for complete search history.

(56) References Cited

U.S. PATENT DOCUMENTS

| | | | |
|---|---|---|---|
| 5,702,613 A | 12/1997 | Sommese et al. | |
| 5,936,043 A | 8/1999 | Brown | |
| 6,072,101 A * | 6/2000 | Beihoffer | .......... A61F 13/15203 604/367 |
| 6,147,178 A | 11/2000 | Nakamura et al. | |
| 6,159,591 A | 12/2000 | Beihoffer et al. | |
| 6,194,522 B1 | 2/2001 | Brown | |
| 6,235,965 B1 | 5/2001 | Beihoffer et al. | |
| 6,342,652 B1 | 1/2002 | Harada et al. | |
| 6,509,512 B1 | 1/2003 | Beihoffer et al. | |
| 2001/0029358 A1 | 10/2001 | Beihoffer et al. | |
| 2001/0044612 A1 | 11/2001 | Beihoffer et al. | |
| 2004/0059310 A1 * | 3/2004 | Gagliardi | .......... A61F 13/15203 604/385.01 |
| 2006/0094829 A1 | 5/2006 | Chino et al. | |
| 2008/0033110 A1 | 2/2008 | Suzuki et al. | |
| 2012/0123017 A1 | 5/2012 | Bethea et al. | |

FOREIGN PATENT DOCUMENTS

| | | |
|---|---|---|
| CN | 1286280 A | 3/2001 |
| CN | 102549079 A | 7/2012 |
| DE | 19720345 A1 | 12/1997 |
| EP | 0 780 440 A2 | 6/1997 |
| EP | 0 882 738 A1 | 12/1998 |
| EP | 1 734 060 A1 | 12/2006 |
| EP | 2 452 831 A1 | 5/2012 |
| JP | 4-235150 A | 8/1992 |
| JP | 8-245839 A | 9/1996 |
| JP | 9-188823 A | 7/1997 |
| JP | 9-227628 A | 9/1997 |
| JP | 2006-131663 A | 5/2006 |
| JP | 2011-173986 A | 9/2011 |
| JP | 2012-117060 A | 6/2012 |
| WO | 2005/097845 A1 | 10/2005 |

OTHER PUBLICATIONS

International Search Report issued on Jun. 17, 2014 for PCT/JP2014/062692 filed on May 13, 2014.
Extended European Search Report issued Mar. 31, 2016 in Patent Application No. 14797339.0.
Combined Chinese Office Action and Search Report issued Mar. 25, 2016 in Patent Application No. 201480005357.7 (with English Translation and English Translation of Categories of Cited Documents).
Communication issued Oct. 25, 2016, in European Patent Application No. 14 797 339.0.

* cited by examiner

*Primary Examiner* — Ling Choi
*Assistant Examiner* — Ronald Grinsted
(74) *Attorney, Agent, or Firm* — Oblon, McClelland, Maier & Neustadt, L.L.P.

(57) ABSTRACT

Provided is a polymer composition for use in the production of a crosslinked polymer having excellent tensile strength and abrasion resistance. A polymer composition comprising a polymer having multiple anionic functional groups and a polymer having multiple nitrogenated functional groups each represented by formula (1). The anionic functional groups are at least one group selected from a carboxy group, a sulfo group and a phosphate group. In one embodiment, each of the nitrogenated functional groups represented by formula (1) is bound to a structure derived from a conjugated diene compound or a structure derived from an aromatic vinyl compound.

20 Claims, No Drawings

POLYMER COMPOSITION, CROSSLINKED POLYMER, TIRE, AND POLYMER

TECHNICAL FIELD

The present invention relates to a polymer composition that includes a polymer component that includes two or more types of crosslinkable groups, a crosslinked polymer, a tire, and a polymer.

BACKGROUND ART

Patent Document 1 discloses a thermoplastic elastomer that includes an elastomeric polymer, the elastomeric polymer including a side chain that includes a hydrogen bond-crosslinkable moiety that includes a carbonyl-containing group and a nitrogen-containing heterocyclic ring, and a side chain that includes a covalent bond-crosslinkable moiety, the elastomeric polymer having a glass transition temperature (Tg) of 25° C. or less. The elastomeric polymer can be crosslinked in the covalent bond-crosslinkable moiety via an amide bond, an ester bond, a lactone bond, a urethane bond, an ether bond, a thiourethane bond, or a thioether bond. The main chain of the elastomeric polymer includes a diene-based rubber, an olefin-based rubber, a (hydrogenated) polystyrene-based elastomeric polymer, a polyolefin-based elastomeric polymer, a polyvinyl chloride-based elastomeric polymer, a polyurethane-based elastomeric polymer, a polyester-based elastomeric polymer, or a polyamide-based elastomeric polymer. Patent Document 1 discloses that the thermoplastic elastomer is obtained by reacting a compound that can introduce a nitrogen-containing heterocyclic ring with a side-chain cyclic acid anhydride group of an elastomeric polymer, and discloses that the nitrogen-containing heterocyclic ring introduced by the above reaction and a carbonyl-containing group derived from the cyclic acid anhydride group that is ring-opened by the above reaction form the hydrogen bond-crosslinkable moiety, and the cyclic acid anhydride group that remains unreacted forms the covalent bond-crosslinkable moiety. Patent Document 1 states that the thermoplastic elastomer has excellent recyclability, and exhibits excellent mechanical strength.

RELATED-ART DOCUMENT

Patent Document

Patent Document 1: JP-A-2006-131663

SUMMARY OF THE INVENTION

Technical Problem

However, since the thermoplastic elastomer disclosed in Patent Document 1 includes the carbonyl-containing group and the nitrogen-containing heterocyclic ring in the same molecule, a hydrogen bond may be formed within the molecule, and an intermolecular hydrogen bond may not be sufficiently formed corresponding to the number of functional groups introduced. In this case, the thermoplastic elastomer may exhibit insufficient tensile strength and insufficient abrasion resistance. In view of the above problem, an object of the invention is to provide a polymer composition for producing a crosslinked polymer that exhibits excellent tensile strength and excellent abrasion resistance.

Solution to Problem

The above object is achieved by a polymer composition including a polymer that includes a plurality of anionic functional groups in the molecule, and a polymer that includes a plurality of specific nitrogen-containing functional groups represented by the following formula (1).

wherein * represents that C or N is bonded to another atom.

Effects of the Invention

Since the polymer according to the invention includes two or more types of polymers, and different polymers respectively include the anionic functional group and the specific nitrogen-containing functional group, an intermolecular hydrogen bond or ionic bond can be sufficiently formed. Since the polymer molecules are crosslinked via a hydrogen bond or an ionic bond, it is possible to obtain a polymer that exhibits excellent tensile strength and excellent abrasion resistance as compared with a normal polymer. When the polymer according to the invention is an elastomer, the polymer is crosslinked via a hydrogen bond or an ionic bond in addition to being subjected to either or both of organic peroxide crosslinking and sulfur vulcanization, and exhibits excellent tensile strength and excellent abrasion resistance.

DESCRIPTION OF EMBODIMENTS

Polymer Composition

A polymer composition according to one embodiment of the invention includes a polymer that includes a plurality of anionic functional groups (hereinafter may be referred to as "polymer (A')"), and a polymer that includes a plurality of structures represented by the formula (1) (hereinafter may be referred to as "polymer (B')").

The polymer (A') and the polymer (B') may be either liquid or solid. It is preferable that the polymer (A') and the polymer (B') be solid at room temperature since a polymer composition that exhibits excellent strength can be obtained. The molecular weight of the polymer (A') and the molecular weight of the polymer (B') are not particularly limited. The molecular weight of the polymer (A') and the molecular weight of the polymer (B') may be appropriately selected taking account of the applications of the polymer composition according to one embodiment of the invention, the properties required for each application, and the like. For example, when the main chain of the polymer that is solid at room temperature includes a polyolefin-based polymer, the mass average molecular weight (Mw) of the polymer is preferably 100,000 or more, and particularly preferably about 150,000 to 2,000,000. Note that the term "mass average molecular weight (Mw)" used herein refer to a polystyrene-equivalent mass average molecular weight determined by gel permeation chromatography (GPC).

The anionic functional group included in the polymer (A') and the specific nitrogen-containing functional group included in the polymer (B') are bonded via a hydrogen bond or an ionic bond (hereinafter may be referred to as "a bond due to an electrical attractive force") so that the polymer molecules are crosslinked. The main chain of the polymer (A') and the main chain of the polymer (B') may be appropriately selected taking account of the applications of the polymer composition according to one embodiment of the invention, the properties required for each application, and the like. For example, when the polymer (A') and the polymer (B') are an elastomer, a conjugated diene-based polymer or the like is used as the polymer (A') and the polymer (B').

Examples of the diene-based polymer (elastomer) that may be used as the main chain of the polymer include natural rubber (NR), isoprene rubber (IR), butadiene rubber (BR), 1,2-butadiene rubber, styrene-butadiene rubber (SBR), acrylonitrile-butadiene rubber (NBR), chloroprene rubber (CR), hydrogenated products thereof, and the like.

(A) Conjugated Diene-Based Polymer that Includes a Plurality of Anionic Functional Groups Examples of the polymer (A') that is used in connection with one embodiment of the invention include a conjugated diene-based polymer that includes a plurality of anionic functional groups in the molecule (hereinafter may be referred to as "polymer (A)"). The term "anionic functional group" used herein refers to a functional group that may serve as an anion in water. Examples of the anionic functional group include a carboxyl group, a sulfo group, a phosphoric acid group, and the like.

The anionic functional group may be introduced into the polymer using a method that reacts a compound that includes an anionic functional group with a polymer that does not include an anionic functional group, or a method that copolymerizes a monomer that includes an anionic functional group. It is preferable to use the method that copolymerizes a monomer that includes an anionic functional group since the production process is simple. An exemplary production method is described below.

Polymerization Step 1

A polymerization step 1 produces a polymer that includes an anionic functional group. It is preferable to produce a polymer that includes an anionic functional group using the method that copolymerizes a monomer that includes an anionic functional group (see above).

Examples of the polymerization method include a bulk polymerization method, a suspension polymerization method, an emulsion polymerization method, a solution polymerization method, and the like. The polymerization method may be appropriately selected taking account of the type of monomer used to produce the polymer (A). For example, since a monomer that includes an anionic functional group is normally a water-soluble compound, it is preferable to use an emulsion polymerization method that utilizes water as a polymerization medium. Emulsion polymerization may be effected using a known method. For example, the monomer is emulsified in an aqueous medium in the presence of an emulsifier, and polymerization is initiated using a radical initiator. Polymerization is terminated using a polymerization terminator when the desired polymerization conversion ratio has been reached to obtain a diene-based rubber, for example. The polymer that is used to prepare the polymer composition may also be produced using a solution polymerization method. It is preferable to perform the polymerization by radical polymerization.

Examples of the monomer that includes an anionic functional group include (meth)acrylic acid, vinylsulfonic acid, vinylphosphonic acid, and the like. The monomer that includes an anionic functional group is preferably used in a ratio of 0.1 to 10 mass % based on the total amount of the monomers. If the ratio of the monomer that includes an anionic functional group is too low, the effect achieved by adding the monomer that includes an anionic functional group may be insufficient. If the ratio of the monomer that includes an anionic functional group is too high, processability may deteriorate. Note that the term "(meth)acrylic acid" used herein includes acrylic acid and methacrylic acid.

A monomer other than the monomer that includes an anionic functional group that is used to produce the polymer (A) may be appropriately selected from known monomers taking account of the applications of the polymer composition, and the like. The polymer (A) (conjugated diene-based polymer) may be produced by polymerizing a conjugated diene compound (conjugated diene-based compound), or polymerizing a mixture of a conjugated diene compound and an aromatic vinyl compound.

Examples of the conjugated diene compound (that is subjected to polymerization) include 1,3-butadiene, isoprene, 2,3-dimethyl-1,3-butadiene, and the like. These conjugated diene compounds may be used either alone or in combination. Examples of the aromatic vinyl compound include styrene, 2-methylstyrene, 3-methylstyrene, 4-methylstyrene (p-methylstyrene), α-methylstyrene, and the like. These aromatic vinyl compounds may be used either alone or in combination.

When polymerizing the conjugated diene compound and the aromatic vinyl compound, the aromatic vinyl compound is preferably used in a ratio of 3 to 55 mass %, and more preferably 5 to 50 mass %, based on the total amount of the monomers used for polymerization, since the low hysteresis loss properties and the wet skid resistance are well-balanced when the polymer is crosslinked by vulcanization or the like.

Examples of the emulsifier used for emulsion polymerization include an anionic surfactant, a nonionic surfactant, an amphoteric surfactant, and the like. These emulsifiers may be used either alone or in combination. An anionic surfactant is normally used when it is desired to obtain a stable emulsion (dispersion). For example, a long-chain fatty acid salt having 10 or more carbon atoms, a rosin acid salt, a linear alkyl group-containing benzenesulfonate, or the like may be used as the anionic surfactant. Specific examples of the anionic surfactant include a sodium salt, a potassium salt, and the like of capric acid, lauric acid, myristic acid, palmitic acid, oleic acid, stearic acid, octylbenzenesulfonic acid, dodecylbenzenesulfonic acid, dodecyldiphenyl oxide sulfonic acid, dodecyldiphenyl ether disulfonic acid, and the like. A fluorine-based surfactant may also be used as the emulsifier.

Examples of the radical initiator used to initiate polymerization include an organic peroxide such as benzoyl peroxide, lauroyl peroxide, tert-butyl hydroperoxide, cumene hydroperoxide, paramethane hydroperoxide, trimethylbicycloheptyl hydroperoxide, di-tert-butyl peroxide, and dicumyl peroxide. A diazo compound such as azobisisobutyronitrile, an inorganic peroxide such as potassium persulfate, a redox catalyst such as a combination of a peroxide and ferrous sulfate, and the like may also be used as the radical initiator. These radical initiators may be used either alone or in combination.

A chain transfer agent (molecular weight modifier) may be used to control the molecular weight of the diene-based polymer. Examples of the chain transfer agent include an alkylmercaptan such as tert-dodecylmercaptan and n-dodecylmercaptan, carbon tetrachloride, a thioglycol, diterpene, terpinolene, gamma-terpinene, an α-methylstyrene dimer, and the like.

When producing the diene-based polymer by emulsion polymerization, each monomer, the emulsifier, the radical initiator, the chain transfer agent, and the like may be put into a reaction vessel at one time, and subjected to polymerization, or each component may be successively (continuously) or intermittently added during polymerization (reaction). The polymer (A) may normally be produced at 0 to 100° C. (preferably 0 to 80° C.) using a reactor from which oxygen has been removed. The operation (reaction) conditions (e.g., temperature and stirring speed) and the like may be appropriately changed during the reaction. The monomer may be polymerized in a continuous manner or a batchwise manner.

Gelation may occur as the polymerization conversion ratio increases. Therefore, it is preferable to prevent a situation in which the polymerization conversion ratio exceeds 85% (more preferably 80%). It is particularly preferable to terminate polymerization when the polymerization conversion ratio has reached 30 to 70%. Polymerization is terminated by adding a polymerization terminator when the desired polymerization conversion ratio has been reached. Examples of the polymerization terminator include an amine compound such as hydroxylamine and diethylhydroxylamine, a quinone compound such as hydroquinone, and the like. After terminating polymerization, unreacted monomers are optionally removed from the reaction system by steam stripping or the like to obtain a latex in which a diene-based polymer is dispersed.

The latex may be used directly as an aqueous dispersion of the polymer (A), or a dispersion in which the polymer (A) is dispersed as an oil-extended rubber (to which a rubber extender oil is added). The rubber extender oil is not particularly limited. For example, a naphthenic process oil, a paraffinic process oil, an aromatic process oil, or the like may be used as the rubber extender oil. The rubber extender oil used to obtain an oil-extended rubber is preferably used in an amount from 5 to 100 parts by mass, and particularly preferably 10 to 60 parts by mass, for 100 parts by mass of the diene-based polymer included in the latex.

A compound that does not exhibit polymerizability and can dissolve the monomer may be used as an organic solvent used when effecting solution polymerization. The organic solvent may be appropriately selected taking account of the type of monomer. Specific examples of the organic solvent include an ether-based solvent such as propylene glycol methyl ether, and an ester-based solvent such as propylene glycol methyl ether acetate.

(B) Conjugated Diene-Based Polymer that Includes a Plurality of Specific Functional Groups Examples of the polymer (B') that is used in connection with one embodiment of the invention include a conjugated diene-based polymer that includes a plurality of structures represented by the following formula (1) in the molecule (hereinafter may be referred to as "polymer (B)").

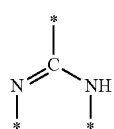

(1)

wherein * represents that C or N is bonded to another atom.

The structure represented by the formula (1) (hereinafter may be referred to as "specific nitrogen-containing functional group") can form a bond due to an electrical attractive force with the anionic functional group included in the polymer (A). The specific nitrogen-containing functional group may be bonded to the terminal of the polymer (B), or may be bonded to a carbon atom included in the main chain of the polymer (B), or may be bonded to a linking group that is bonded to the main chain of the polymer (B). Examples of the linking group that is bonded to the main chain of the polymer (B) include an alkylphenyl group (included in an aromatic vinyl compound), a structure derived from a side-chain vinyl group included in a conjugated diene-based polymer, and the like.

Specific examples of the polymer (B) include a polymer that includes a group represented by the following formula (1-1) in the side chain, and the like.

(1-1)

wherein $R^1$ and $R^2$ are independently a hydrocarbyl group, or a hydrocarbyl group that includes —$NR^3$— (wherein $R^3$ is a hydrocarbyl group) situated between carbon atoms, and * represents that C is bonded to a carbon atom included in the main chain of the polymer, or bonded to a linking group that is bonded to the main chain of the polymer.

The hydrocarbyl group represented by $R^1$ and $R^2$ is preferably a linear or branched alkyl group having 1 to 20 carbon atoms, a cycloalkyl group having 3 to 20 carbon atoms, or an aryl group having 5 to 20 carbon atoms. The hydrocarbyl group represented by $R^3$ is preferably a linear or branched alkyl group having 1 to 6 carbon atoms, a cyclohexyl group, or a phenyl group.

The content of the group represented by the formula (1) in the polymer (B) is preferably 0.1 to 10 mol %, and more preferably 0.3 to 5 mol %, based on the total structural units (derived from the monomers) included in the polymer (B).

The specific nitrogen-containing functional group may be introduced into the polymer (B) using a known method. For example, the specific nitrogen-containing functional group may be introduced into the polymer (B) using a method that reacts a compound that includes the specific nitrogen-containing functional group with a polymer that does not include the specific nitrogen-containing functional group, or a method that copolymerizes a monomer that includes the specific nitrogen-containing functional group. It is preferable to introduce the specific nitrogen-containing functional group into the polymer (B) using the method that reacts a compound that includes the specific nitrogen-containing functional group with a polymer that does not include the specific nitrogen-containing functional group since the production process is simple. An exemplary production method is described below. The method for producing the polymer (B) described below includes a polymerization step 2 and a modification step.

Polymerization Step 2

The polymerization step 2 produces a polymer that is reacted with a compound that includes the specific nitrogen-containing functional group. In the polymerization step 2, a polymer that has a reaction point used for the modification step (described later) is produced by polymerizing a conjugated diene compound, or polymerizing a conjugated diene compound and an aromatic vinyl compound.

Examples of the conjugated diene compound used for polymerization include 1,3-butadiene, isoprene, 2,3-dimethyl-1,3-butadiene, and the like. These conjugated diene compounds may be used either alone or in combination.

Examples of the aromatic vinyl compound include styrene, 2-methylstyrene, 3-methylstyrene, 4-methylstyrene (p-methylstyrene), α-methylstyrene, and the like. Note that these aromatic vinyl compounds may be used either alone or in combination.

The polymer produced by the polymerization step 2 may be either a homopolymer or a copolymer as long as the polymer includes at least a structural unit derived from the conjugated diene compound. When producing a copolymer of the conjugated diene compound and the aromatic vinyl compound, the copolymer may be either a random copolymer or a block copolymer. The aromatic vinyl compound is preferably used in a ratio of 3 to 55 mass %, and more preferably 5 to 50 mass %, based on the total amount of the monomers used for polymerization, since the low hysteresis loss properties and the wet skid resistance are well-balanced when the polymer is crosslinked.

An additional monomer other than the conjugated diene compound and the aromatic vinyl compound may also be used for polymerization. Examples of the additional monomer include acrylonitrile, methyl (meth)acrylate, ethyl (meth)acrylate, hydroxyethyl (meth)acrylate, and the like. The additional monomer is preferably used in a ratio of less than 25 mass %, more preferably 15 mass % or less, and still more preferably 10 mass % or less, based on the total amount of the monomers used for polymerization.

The polymer (B) (conjugated diene-based polymer) may be produced by polymerizing the conjugated diene compound optionally together with the aromatic vinyl compound and an additional monomer. The monomer may be polymerized using a solution polymerization method, a vapor-phase polymerization method, or a bulk polymerization method. Among these, a solution polymerization method is particularly preferable. The monomer may be polymerized in a batchwise manner or a continuous manner.

When using a solution polymerization method, the monomer that includes the conjugated diene compound may be subjected to anionic polymerization in an organic solvent in the presence of an initiator and an optional randomizer, for example.

At least either an alkali metal compound or an alkaline-earth metal compound may be used as the initiator. An alkali metal compound and an alkaline-earth metal compound that are normally used as an anionic polymerization initiator may be used as the alkali metal compound and the alkaline-earth metal compound. Examples of the alkali metal compound and the alkaline-earth metal compound include alkyllithiums such as methyllithium, ethyllithium, n-propyllithium, n-butyllithium, sec-butyllithium, and t-butyllithium, 1,4-dilithiobutane, phenyllithium, stilbenelithium, naphthyllithium, naphthylsodium, naphthylpotassium, di-n-butylmagnesium, di-n-hexylmagnesium, ethoxypotassium, calcium stearate, and the like. Among these, lithium compounds are preferable.

The randomizer may be used to adjust the content (vinyl content) of vinyl bonds (1,2-bond and 3,4-bond), for example. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, tetramethylethylenediamine, and the like. These compounds may be used either alone or in combination.

The organic solvent used for polymerization may be an organic solvent that is inert to the reaction. Examples of the organic solvent used for polymerization include aliphatic hydrocarbons, alicyclic hydrocarbons, aromatic hydrocarbons, and the like. It is preferable to use a hydrocarbon having 3 to 8 carbon atoms. Specific examples of the hydrocarbon having 3 to 8 carbon atoms include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene, and the like. These organic solvents may be used either alone or in combination.

It is also possible to produce the conjugated diene-based polymer by radical polymerization. Examples of an organic solvent and a radical initiator used for radical polymerization include those mentioned above.

When using the solution polymerization method, the monomer concentration in the reaction solvent is preferably 5 to 50 mass %, and more preferably 10 to 30 mass %, from the viewpoint of maintaining the balance between productivity and polymerization controllability. The polymerization reaction temperature is preferably −20 to 150° C., more preferably 0 to 120° C., and particularly preferably 20 to 100° C. It is preferable to effect the polymerization reaction under a pressure sufficient to substantially maintain the monomer to be in a liquid phase. Such a pressure may be achieved by pressurizing the reactor using gas that is inert to the polymerization reaction, for example.

A conjugated diene-based polymer having an active terminal can thus be obtained. The polystyrene-equivalent mass average molecular weight (Mw) of the conjugated diene-based polymer determined by GPC is preferably $1.0\times 10^5$ to $2.0\times 10^6$. If the polystyrene-equivalent mass average molecular weight (Mw) of the conjugated diene-based polymer is less than $1.0\times 10^5$, a deterioration in low fuel consumption performance and abrasion resistance may occur when the polymer composition according to one embodiment of the invention is used for an automotive tire. If the polystyrene-equivalent mass average molecular weight (Mw) of the conjugated diene-based polymer exceeds $2.0\times 10^6$, the processability of the polymer composition may deteriorate. The polystyrene-equivalent mass average molecular weight (Mw) of the conjugated diene-based polymer is more preferably $1.2\times 10^5$ to $1.5\times 10^6$, and still more preferably $1.5\times 10^5$ to $1.0\times 10^6$.

The vinyl content in the conjugated diene-based polymer is preferably 30 to 65 mass %, more preferably 33 to 62 mass %, and still more preferably 35 to 60 mass %. If the vinyl content in the conjugated diene-based polymer is less than 30 mass %, the grip properties may decrease to a large extent. If the vinyl content in the conjugated diene-based polymer exceeds 65 mass %, a deterioration in abrasion resistance may occur. Note that the vinyl content in the conjugated diene-based polymer may be determined by $^1$H-NMR.

Modification Step

In the modification step, the conjugated diene-based polymer produced by the polymerization step 2 is reacted with a compound (C) having a carbodiimide structure. The specific nitrogen-containing functional group can thus be introduced into the conjugated diene-based polymer.

The compound (C) is not particularly limited as long as the compound (C) includes the functional group represented by —N=C=N—. Specific examples of the compound (C) include dicyclohexylcarbodiimide, diisopropylcarbodiimide, 1-ethyl-3-(3-dimethylaminopropyl)carbodiimide, 1-ethyl-3-tert-butylcarbodiimide, di-tert-butylcarbodiimide, and the like.

The specific nitrogen-containing functional group may be introduced into the conjugated diene-based polymer using an arbitrary method. The specific nitrogen-containing functional group may be introduced into the conjugated diene-based polymer by appropriately combining normal methods used in organic chemistry. For example, an active site may be formed in an unsaturated bond or a functional group that is included in the conjugated diene-based polymer obtained by the polymerization reaction, and reacted with the compound (C).

More specifically, (i) the unsaturated double bond (vinyl group) included in the structural unit that is included in the conjugated diene-based polymer and derived from the conjugated diene compound may be subjected to hydrometalation, and the conjugated diene-based polymer may be reacted with the compound (C), or (ii) at least one of the allylic position included in the structural unit that is included in the conjugated diene-based polymer and derived from the conjugated diene compound, and the benzylic position included in the structural unit that is included in the conjugated diene-based polymer and derived from the aromatic vinyl compound, may be subjected to lithiation, and the conjugated diene-based polymer may be reacted with the compound (C), for example.

When using the method (i), the conjugated diene-based polymer may be subjected to hydrometalation by reacting the conjugated diene-based polymer obtained by the polymerization step with a hydrometalation agent. A hydrogen atom and a metal atom are thus added to an unsaturated bond that is included in the conjugated diene-based polymer and is not situated at the terminal (i.e., the vinyl bond included in the structural unit derived from the conjugated diene compound).

A compound that includes a metal-hydrogen bond that bonds a metal atom (e.g., aluminum, silicon, zirconium, or tin) and a hydrogen atom may be used as the hydrometalation agent. It is preferable to use a compound that includes an aluminum-hydrogen bond. Specific examples of such a compound include lithium aluminum hydride, diisobutylaluminum hydride, and the like. The amount of the hydrometalation agent used for the reaction is not particularly limited. It is preferable to use the hydrometalation agent in such an amount that the molar equivalent of the hydrometalation agent is 0.1 to 20, and more preferably 1 to 10, based on 1 molar equivalent of the conjugated diene-based polymer.

The hydrometalation reaction may be effected as a solution reaction in the presence of an appropriate catalyst. The solution reaction may be effected directly using the solution that includes unreacted monomers after completion of the polymerization reaction, or may be effected after isolating the polymer included in the solution, and dissolving the polymer in an appropriate solvent (e.g., cyclohexane).

The hydrometalation reaction temperature is normally set to be equal to the polymerization reaction temperature, preferably −20 to 150° C., more preferably 0 to 120° C., and still more preferably 20 to 100° C. The reaction time is preferably 1 minute to 3 hours, and more preferably 2 minutes to 1 hour.

The conjugated diene-based polymer is reacted with the compound (C) preferably in a solution after completion of the hydrometalation reaction to bond the vinyl bond site (hydrometalated site) of the conjugated diene-based polymer to the functional group of the compound (C). A modified conjugated diene-based polymer that includes the specific nitrogen-containing functional group can thus be obtained.

When effecting the above reaction, the compound (C) is preferably used in an amount of 0.1 to 10 molar equivalents, and more preferably 0.3 to 5 molar equivalents, based on 1 molar equivalent of the hydrometalation agent. The reaction temperature is normally set to be equal to the polymerization reaction temperature, preferably −20 to 150° C., more preferably 0 to 120° C., and still more preferably 20 to 100° C. The reaction time is preferably 1 minute to 5 hours, and more preferably 2 minutes to 1 hour.

When using the method (ii), the conjugated diene-based polymer may be subjected to lithiation by reacting the conjugated diene-based polymer obtained by the polymerization step with a lithiation agent in the presence of a promoter (e.g., tetramethylethylenediamine). This reaction lithiates the allylic position of the structural unit that is included in the conjugated diene-based polymer and derived from the conjugated diene compound, or the benzylic position of the structural unit that is included in the conjugated diene-based polymer and derived from the aromatic vinyl compound.

Examples of the lithiation agent used for the reaction include methyllithium, n-butyllithium, s-butyllithium, t-butyllithium, and the like. The amount of the lithiation agent used for the reaction is not particularly limited. It is preferable to use the lithiation agent in such an amount that the molar equivalent of the lithiation agent is 0.1 to 20, and more preferably 1 to 10, based on 1 molar equivalent of the polymer.

The lithiation reaction may be effected as a solution reaction, for example. The solution reaction may be effected directly using the solution that includes unreacted monomers before completion of the polymerization reaction or after completion of the polymerization reaction in the polymerization step, or may be effected after isolating the polymer included in the solution and dissolving the isolated polymer in an appropriate solvent (e.g., cyclohexane).

The lithiation reaction temperature is normally set to be equal to the polymerization reaction temperature, preferably −20 to 150° C., more preferably 0 to 120° C., and particularly preferably 20 to 100° C. The reaction time is preferably 1 minute to 3 hours, and more preferably 2 to 30 minutes.

The lithiated site of the conjugated diene-based polymer is bonded to the functional group of the compound (C) by reacting the conjugated diene-based polymer with the compound (C) preferably in a solution after effecting the lithiation reaction. The modified conjugated diene-based polymer that includes the specific nitrogen-containing functional group can thus be obtained.

The compound (C) usage, the reaction temperature and the reaction time may be the same as those described above in connection with the hydrometalation reaction.

Polymer Composition

The polymer composition according to one embodiment of the invention preferably includes the polymer (A) and the polymer (B). It is considered that the anionic functional group included in the polymer (A) and the specific nitrogen-containing functional group included in the polymer (B) are bonded due to an electric invitation force so that the polymer molecules form a crosslinked structure, and the abrasion resistance of the polymer composition is improved. The polymer (A) and the polymer (B) may be used in an arbitrary ratio. For example, it is preferable to use the polymer (A) and the polymer (B) so that the ratio (anionic functional group:specific nitrogen-containing functional group) of the anionic functional group included in the polymer (A) to the specific nitrogen-containing functional group included in the polymer (B) is 1:0.2 to 1:5.

The composition may be prepared using a method that is appropriately selected taking account of the state (form) of the polymer. For example, when the polymer is a rubber polymer, the composition is prepared by kneading the components using a kneader, a mixer (e.g., Banbury mixer), an open roll, or the like. An organic peroxide or sulfur may be added to the composition prepared by kneading the components. When the polymer composition includes an organic peroxide or sulfur, the polymer composition is subjected to peroxide crosslinking or sulfur vulcanization so that the polymer molecules are covalently crosslinked. A crosslinked polymer is thus obtained. The organic peroxide, sulfur, or a vulcanization accelerator is mixed into the composition using an open roll. The resulting polymer composition is subjected to crosslinking or vulcanization at a crosslinking temperature or a sulfur vulcanization temperature (e.g., about 150 to 200° C.) (that is determined taking account of the decomposition temperature of the organic peroxide, for example) for about 1 to 30 minutes. A covalent bond-crosslinkable group (i.e., peroxide-crosslinkable group or sulfur-crosslinkable group) is thus formed.

The organic peroxide used for peroxide crosslinking (that implements covalent bond-crosslinking) is not particularly limited as long as the organic peroxide can crosslink the polymer (A) and the polymer (B). Examples of the organic peroxide include dicumyl peroxide, tert-butyl peroxide, tert-butylcumyl peroxide, 1,1-di(tert-butylperoxy)-3,3,5-trimethylcyclohexane, 2,5-dimethyl-2,5-di(tert-butylperoxy) hexane, 2,5-dimethyl-2,5-di(tert-butylperoxy)hexyne-3,1,3-di(tert-butylperoxyisopropyl)benzene, 2,5-dimethyl-2,5-di (benzoylperoxy)hexane, tert-butylperoxy benzoate, tert-butylperoxy isopropyl carbonate, n-butyl-4,4-di(tert-butylperoxy)valerate, and the like. Among these, dicumyl peroxide is preferable.

The organic peroxide is used in such an amount that 0.1 to 10 mol % (preferably 0.3 to 5 mol %) of a hydrogen bond-crosslinkable moiety and 0.1 to 5 mol % (preferably 0.3 to 3 mol %) of a covalent bond-crosslinkable moiety are formed based on the structural units (derived from the monomers) included in the main chain of the polymer. Specifically, the organic peroxide is used in an amount of 0.1 to 5 parts by mass, and preferably 0.5 to 3 parts by mass, based on 100 parts by mass (i.e., the total amount of the polymer (A) and the polymer (B)) of the polymer before a hydrogen bond-crosslinkable moiety is formed.

It is preferable to use a vulcanization accelerator when effecting sulfur vulcanization that implements covalent bond-crosslinking Examples of the vulcanization accelerator include a thiazole-based vulcanization accelerator (e.g., MBT, MBTS, and ZnMBT), a sulfeneamide-based vulcanization accelerator (e.g., CBS, DCBS, and BBS), a guanidine-based vulcanization accelerator (e.g., DPG, DOTG, and OTBG), a thiuram-based vulcanization accelerator (e.g., TMTD, TMTM, TBzTD, TETD, and TBTD), a dithiocarbamate-based vulcanization accelerator (e.g., ZTC and NaBDC), a xanthate-based vulcanization accelerator (e.g., ZnBX), and the like.

The sulfur vulcanization system is used in such an amount that 0.1 to 10 mol % (preferably 0.1 to 5 mol %) of a hydrogen bond-crosslinkable moiety and 0.1 to 5 mol % (preferably 0.1 to 3 mol %) of a covalent bond-crosslinkable moiety are formed based on the structural units (derived from the monomers) included in the main chain of the polymer. More specifically, sulfur is used in an amount of 0.1 to 10 parts by mass, and preferably 0.1 to 5 parts by mass, based on 100 parts by mass (i.e., the total amount of the polymer (A) and the polymer (B)) of the polymer before a hydrogen bond-crosslinkable moiety is formed, and the vulcanization accelerator is used in an amount of 0.1 to 10 parts by mass, and preferably 0.1 to 5 parts by mass, based on 100 parts by mass (i.e., the total amount of the polymer (A) and the polymer (B)) of the polymer before a hydrogen bond-crosslinkable moiety is formed.

The polymer composition that includes the above components may optionally further appropriately include a compounding ingredient generally used for rubber, such as a reinforcing agent or a filler such as carbon black, silica, talc, graphite, and calcium silicate, a processing aid such as stearic acid, an acid acceptor such as zinc oxide, a softener, a plasticizer, and an aging preventive.

When using the polymer in the form of a solution, the polymer solution and an optional component may be put into a tank provided with a stirrer, and stirred to prepare a polymer composition.

When the polymer composition according to one embodiment of the invention includes an organic peroxide or sulfur in addition to the polymer (A) and the polymer (B), the polymer composition may be molded, crosslinked (peroxide crosslinking or vulcanization), and applied as various rubber products as a crosslinked polymer. For example, the polymer composition may be applied to a tire (e.g., tire tread, undertread, carcass, sidewall, and bead), other industrial products such as a vibration-proof rubber, a fender, a belt, and a hose, and the like. In particular, the polymer composition may suitably be used as a tire tread rubber from the viewpoint of providing low fuel consumption performance.

EXAMPLES

The invention is further described below by way of examples. Note that the invention is not limited to the following examples. In the examples and comparative examples, the unit "parts" refers to "parts by mass", and the unit "%" refers to "mass %", unless otherwise specified. The property values were measured using the following methods.

The bonded styrene content (%) was determined by $^1$H-NMR (500 MHz).

The vinyl content (%) was determined by $^1$H-NMR (500 MHz).

The glass-transition temperature (° C.) was measured according to ASTM D3418.

The polystyrene-reduced weight average molecular weight before modification was determined from the retention time that corresponds to the vertex of the maximum peak of the GPC curve obtained using a gel permeation chromatograph ("HLC-8120GPC" manufactured by Tosoh Corporation).

(GPC Conditions)
Column: "GMHXL" (manufactured by Tosoh Corporation) (×2)
Column temperature: 40° C.
Mobile phase: tetrahydrofuran
Flow rate: 1.0 ml/min
Sample concentration: 10 mg/20 ml The Mooney viscosity (ML1+4, 100° C.) was measured in accordance with JIS K 6300-1 using an L rotor (preheating time: 1 minute, rotor operation time 4 minutes, temperature: 100° C.).

The cold flow value was measured by the following method; The copolymer was held at a temperature of 50° C. and was extruded from a 6.35 mm orifice at a pressure condition of 24.1 kPa. At 10 minutes from the start of extrusion (after the extrusion rate had become constant), the amount (mg) of copolymer extrusion was measured every 30 minutes for 90 minutes. The average value was taken to be the cold flow value (mg/minute). A larger numerical value indicates a poorer shape stability by the rubber and more difficult handling.

Synthesis of SBR Copolymerized with Carboxylic Acid

A reactor (internal volume: 100 L) in which the internal atmosphere had been replaced with nitrogen, was charged with 41.1 L of water, 670 g of sodium dodecyldiphenyl ether disulphonate (emulsifier), 7.5 g of potassium chloride (electrolyte), 9.5 g of sodium ethylenediaminetetraacetate (chelating agent), and 19 g of sodium hydrosulfite (oxygen scavenger). The reactor was then charged with 3.99 g of sodium ethylenediamineacetate, 1.52 g of ferrous sulfate, 240 mL of water including 6.27 g of sodium formaldehyde sulfoxylate (activator), 57 g of tert-dodecylmercaptan (molecular weight modifier), 21.48 L of 1,3-butadiene, 5.43 L of styrene, and 798 g of methacrylic acid. The mixture was stirred at a stirring speed of 330 rpm. After adjusting the temperature of the mixture included in the reactor to 10° C., 11.9 g of p-menthane hydroperoxide (initiator) was added to the mixture to initiate polymerization. The mixture was subjected to polymerization at while controlling the temperature of the mixture at 10° C. When a polymerization reaction did not occur, the activator and the initiator were further added (in an amount of 10 to 50% of the initial amount).

900 mL of a 6.3% N,N-diethylhydroxylamine aqueous solution (polymerization terminator) was added when the polymerization conversion ratio had reached 70% to terminate the polymerization reaction. The mixture was subjected to stripping at 60° C. for 30 minutes under a reduced pressure of −0.1 MPa using a stripping tank to remove residual monomers to obtain a synthetic rubber latex.

Calcium chloride (coagulant) was added to hot water (90° C. or more) at a concentration of 0.1%, and the mixture was stirred to effect dissolution. After confirming that calcium chloride had been sufficiently dissolved, the latex was added to the resulting calcium chloride aqueous solution (heated at 50 to 60° C.) to precipitate a solid rubber. The rubber was washed with water sequentially at 70° C., 50° C., and 20° C., and dried using a hot-air dryer (controlled at 90° C.) to obtain a carboxylic acid-containing conjugated diene-based rubber a.

Example 1

Synthesis and Evaluation of Modified Conjugated Diene-Based Rubber A

An autoclave reactor (internal volume: 5 L) in which the internal atmosphere had been replaced with nitrogen, was charged with 2750 g of cyclohexane, 50.0 g of tetrahydrofuran, 105 g of styrene, and 365 g of 1,3-butadiene. After adjusting the temperature of the mixture included in the reactor to 10° C., a cyclohexane solution including n-butyllithium (5.80 mmol) was added to the mixture to initiate polymerization. The monomers were polymerized under adiabatic conditions, and the maximum temperature reached 85° C.

10 g of butadiene was added to the mixture when the polymerization conversion ratio had reached 99%, and the monomers were polymerized for 5 minutes. After the addition of 20 g of p-methylstyrene, the monomers were polymerized for 10 minutes. After the addition of 10 g of tetramethylethylenediamine and a cyclohexane solution including s-butyllithium (86.0 mmol) to the reaction mixture, the mixture was reacted for 20 minutes. After the addition of a cyclohexane solution including 30 g of diisopropylcarbodiimide to the reaction mixture, a modification reaction was effected for 30 minutes. 2.0 g of 2,6-di-tert-butyl-p-cresol was added to the resulting polymer solution. The solvent was removed by performing steam stripping using hot water (of which the pH was adjusted to 9 using sodium hydroxide), and the rubber was dried using a heated roll (controlled at 110° C.) to obtain a modified conjugated diene-based rubber A.

Table 1 shows the components used to produce the modified conjugated diene-based rubber A, and Table 2 shows the properties of the modified conjugated diene-based rubber A. A rubber composition was prepared using the modified conjugated diene-based rubber A and the carboxylic acid-containing conjugated diene-based rubber a (see Table 3), and vulcanized, and the properties of the vulcanized rubber composition were evaluated. The results are shown in Table 4.

Example 2

Synthesis and Evaluation of Modified Conjugated Diene-Based Rubber B

An autoclave reactor (internal volume: 5 L) in which the internal atmosphere had been replaced with nitrogen, was charged with 2750 g of cyclohexane, 50.0 g of tetrahydrofuran, 105 g of styrene, and 365 g of 1,3-butadiene. After adjusting the temperature of the mixture included in the reactor to 10° C., a cyclohexane solution including n-butyllithium (5.80 mmol) was added to the mixture to initiate polymerization. The monomers were polymerized under adiabatic conditions, and the maximum temperature reached 85° C.

10 g of butadiene was added to the mixture when the polymerization conversion ratio had reached 99%, and the monomers were polymerized for 5 minutes. After the addition of 20 g of p-methylstyrene, the monomers were polymerized for 10 minutes. After the addition of 10 g of tetramethylethylenediamine and a cyclohexane solution including s-butyllithium (86.0 mmol) to the reaction solution, the mixture was reacted for 20 minutes. After the addition of a cyclohexane solution including 36 g of dicyclohexylcarbodiimide to the reaction mixture, a modification reaction was effected for 30 minutes. 2.0 g of 2,6-di-tert-butyl-p-cresol was added to the resulting polymer solution. The solvent was removed by performing steam stripping using hot water (of which the pH was adjusted to 9 using sodium hydroxide), and the rubber was dried using a heated roll (controlled at 110° C.) to obtain a modified conjugated diene-based rubber B.

Table 1 shows the components used to produce the modified conjugated diene-based rubber B, and Table 2 shows the properties of the modified conjugated diene-based rubber B. A rubber composition was prepared using the modified conjugated diene-based rubber B and the carboxylic acid-containing conjugated diene-based rubber a (see Table 3), and vulcanized, and the properties of the vulcanized rubber composition were evaluated. The results are shown in Table 4.

Example 3

Synthesis and Evaluation of Modified Conjugated Diene-Based Rubber C

An autoclave reactor (internal volume: 5 L) in which the internal atmosphere had been replaced with nitrogen, was charged with 2750 g of cyclohexane, 50.0 g of tetrahydrofuran, 105 g of styrene, 365 g of 1,3-butadiene, and 20 g of p-methylstyrene. After adjusting the temperature of the mixture included in the reactor to 10° C., a cyclohexane solution including n-butyllithium (5.80 mmol) was added to the mixture to initiate polymerization. The monomers were polymerized under adiabatic conditions, and the maximum temperature reached 85° C.

10 g of butadiene was added to the mixture when the polymerization conversion ratio had reached 99%, and the monomers were polymerized for 5 minutes. After the addition of 10 g of tetramethylethylenediamine and a cyclohexane solution including s-butyllithium (86.0 mmol) to the reaction solution, the mixture was reacted for 20 minutes. After the addition of a cyclohexane solution including 30 g of diisopropylcarbodiimide to the reaction mixture, a modification reaction was effected for 30 minutes. 2.0 g of 2,6-di-tert-butyl-p-cresol was added to the resulting polymer solution. The solvent was removed by performing steam stripping using hot water (of which the pH was adjusted to 9 using sodium hydroxide), and the rubber was dried using a heated roll (controlled at 110° C.) to obtain a modified conjugated diene-based rubber C.

Table 1 shows the components used to produce the modified conjugated diene-based rubber C, and Table 2 shows the properties of the modified conjugated diene-based rubber C. A rubber composition was prepared using the modified conjugated diene-based rubber C and the carboxylic acid-containing conjugated diene-based rubber a (see Table 3), and vulcanized, and the properties of the vulcanized rubber composition were evaluated. The results are shown in Table 4.

Example 4

Synthesis and Evaluation of Modified Conjugated Diene-Based Rubber D

An autoclave reactor (internal volume: 5 L) in which the internal atmosphere had been replaced with nitrogen, was charged with 2750 g of cyclohexane, 50.0 g of tetrahydrofuran, 105 g of styrene, 365 g of 1,3-butadiene, and 20 g of p-methylstyrene. After adjusting the temperature of the mixture included in the reactor to 10° C., a cyclohexane solution including n-butyllithium (5.80 mmol) was added to the mixture to initiate polymerization. The monomers were polymerized under adiabatic conditions, and the maximum temperature reached 85° C.

10 g of butadiene was added to the mixture when the polymerization conversion ratio had reached 99%, and the monomers were polymerized for 5 minutes. After the addition of 10 g of tetramethylethylenediamine and a cyclohexane solution including s-butyllithium (86.0 mmol) to the reaction solution, the mixture was reacted for 20 minutes. After the addition of a cyclohexane solution including 36 g of dicyclohexylcarbodiimide to the reaction mixture, a modification reaction was effected for 30 minutes. 2.0 g of 2,6-di-tert-butyl-p-cresol was added to the resulting polymer solution. The solvent was removed by performing steam stripping using hot water (of which the pH was adjusted to 9 using sodium hydroxide), and the rubber was dried using a heated roll (controlled at 110° C.) to obtain a modified conjugated diene-based rubber D.

Table 1 shows the components used to produce the modified conjugated diene-based rubber D, and Table 2 shows the properties of the modified conjugated diene-based rubber D. A rubber composition was prepared using the modified conjugated diene-based rubber D and the carboxylic acid-containing conjugated diene-based rubber a (see Table 3), and vulcanized, and the properties of the vulcanized rubber composition were evaluated. The results are shown in Table 4.

Comparative Example 1

Synthesis and Evaluation of Conjugated Diene-Based Rubber S

An autoclave reactor (internal volume: 5 L) in which the internal atmosphere had been replaced with nitrogen, was charged with 2750 g of cyclohexane, 50.0 g of tetrahydrofuran, 125 g of styrene, and 365 g of 1,3-butadiene. After adjusting the temperature of the mixture included in the reactor to 10° C., a cyclohexane solution including n-butyllithium (5.80 mmol) was added to the mixture to initiate polymerization. The monomers were polymerized under adiabatic conditions, and the maximum temperature reached 85° C.

10 g of butadiene was added to the mixture when the polymerization conversion ratio had reached 99%, and the monomers were polymerized for 5 minutes. 2.0 g of 2,6-di-tert-butyl-p-cresol was added to the resulting polymer solution. The solvent was removed by performing steam stripping using hot water (of which the pH was adjusted to 9 using sodium hydroxide), and the rubber was dried using a heated roll (controlled at 110° C.) to obtain a conjugated diene-based rubber S.

Table 1 shows the components used to produce the conjugated diene-based rubber S, and Table 2 shows the properties of the conjugated diene-based rubber S. A rubber composition was prepared using the conjugated diene-based rubber S and the carboxylic acid-containing conjugated diene-based rubber a (see Table 3), and vulcanized, and the properties of the vulcanized rubber composition were evaluated. The results are shown in Table 4.

(The Method for Mixing (Kneading) the Rubber Compositions and Property Evaluation)

Using a Plastomill (250 cc capacity) equipped with a temperature control device, the following were mixed/kneaded in a first-stage mixing/kneading at a fill rate of 72% and 60 rpm: the modified conjugated diene rubber (note that the conjugated diene rubber was used in comparative Example 1), SBR copolymerized with carboxylic acid, silica, silane coupling agent, stearic acid, ageing inhibitor, and zinc while (i.e. zinc oxide). Then, after the blend obtained as described above was cooled to room temperature, the sulfur and vulcanization accelerator were mixed/kneaded in a second-stage mixing/kneading. This was molded and vulcanized with a vulcanization press for a prescribed period of time at 160° C. and the following property evaluations, which are indicative of tire performance, were carried out.

(i) Mooney viscosity: The pre-vulcanized rubber composition was used for the measurement sample and measurement was performed in accordance with JIS K6300-1 using an L rotor and the following conditions: preheating for 1 minute, rotor running time=4 minutes, and temperature=100° C.

(ii) Tensile strength: The 300% modules was measured according to JIS K 6301. This is reported as an index, wherein larger numerical values indicate a higher tensile s strength and thus are better.

(iii) tan δ at 0° C.: The vulcanized rubber was used as the measurement sample. The measurement was carried out at a tensile dynamic strain of 0.14%, an angular velocity of 100 radians per second, and 0° C. using a dynamic spectrometer (manufactured by Rheometrics (USA)). This is reported as an index, wherein larger numerical values indicate a higher wet skid resistance and thus are better.

(iv) tan δ at 70° C.: The vulcanized rubber was used as the measurement sample. The measurement was carried out at a tensile dynamic strain of 0.7%, an angular velocity of 100 radians per second, and 70° C. using a dynamic spectrometer (manufactured by Rheometrics (USA)). This is reported as an index, wherein larger numerical values indicate a smaller low hysteresis loss character and thus are better.

TABLE 1

| | Example 1 | Example 2 | Example 3 | Example 4 | Comparative Example 1 |
|---|---|---|---|---|---|
| Polymerization recipe | A | B | C | D | S |
| Solvent | | | | | |
| cyclohexane (g) | 2750 | 2750 | 2750 | 2750 | 2750 |
| Vinyl content modifier | | | | | |
| tetrahydrofuran (g) | 50 | 50 | 50 | 50 | 50 |
| Monomer | | | | | |
| styrene (g) | 105 | 105 | 105 | 105 | 125 |
| p-methylstyrene (g) | | | 20 | 20 | |
| butadiene (g) | 365 | 365 | 365 | 365 | 365 |
| supplemental butadiene (g) | 10 | 10 | 10 | 10 | 10 |
| supplemental p-methylstyrene (g) | 20 | 20 | | | |
| Initiator | | | | | |
| n-butyllithium (mmol) | 5.80 | 5.80 | 5.80 | 5.80 | 5.80 |
| Modifying agent | | | | | |
| diisopropyl-carbodiimide (g) | 30 | | 30 | | |
| dicyclohexyl-carbodiimide (g) | | 36 | | 36 | |

TABLE 2

| [Properties of modified conjugated diene rubber] | Example 1 | Example 2 | Example 3 | Example 4 | Comparative Example 1 |
|---|---|---|---|---|---|
| | Type of modified conjugated diene rubber | | | | |
| | A | B | C | D | S |
| Bonded styrene content (mass %) | 24 | 23 | 23 | 24 | 25 |
| Vinyle content (%) | 55 | 56 | 56 | 54 | 56 |
| Glass-transition temperature (° C.) | −26 | −27 | −25 | −25 | −28 |
| Weight average molecular weight (×10⁴) | 20 | 20 | 21 | 20 | 20 |
| Mooney viscosity (ML1 + 4, 100° C.) | 66 | 67 | 67 | 64 | 63 |
| Cold flow value (mg/minute) | 0.2 | 0.1 | 0.2 | 0.2 | 0.2 |

TABLE 3

| Compounding recipe (phr) | I |
|---|---|
| modified conjugated diene rubber | 50 |
| SBR copolymerized with carboxylic acid | 50 |
| silica *1) | 70 |
| silane coupling agent *2) | 5.6 |
| stearic acid | 2.0 |
| aging preventive *3) | 1.0 |
| zinc oxide | 3.0 |
| vulcanization accelerator CZ *4) | 1.8 |
| vulcanization accelerator D *5) | 1.5 |
| sulfur | 1.5 |

*1) NipsilAQ manufactured by Tosoh Silica Corporation
*2) Si69 manufactured by Evonik Industries
*3) NOCRAC 810NA manufactured by Ouchi Shinko Chemical Industrial
*4) NOCCELER CZ manufactured by Ouchi Shinko Chemical Industrial
*5) NOCCELER D manufactured by Ouchi Shinko Chemical Industrial

TABLE 4

| [Properties of crosslinked rubber composition] | Example 1 | Example 2 | Example 3 | Example 4 | Comparative Example 1 |
|---|---|---|---|---|---|
| | Type of modified conjugated diene rubber | | | | |
| | A | B | C | D | S |
| | Type of SBR copolymerized with carboxylic acid | | | | |
| | a | a | a | a | a |
| Compound recipe | I | I | I | I | I |
| Mooney viscosity (ML1 + 4,100° C.) | 107 | 98 | 118 | 109 | 73 |
| Tensile strength (index) | 148 | 138 | 137 | 129 | 100 |
| 0° C. tanδ (index) | 108 | 105 | 104 | 104 | 100 |
| 70° C. tanδ (index) | 112 | 110 | 109 | 108 | 100 |
| Wear resistance (index) | 120 | 125 | 122 | 128 | 100 |

As is clear from Table 4, the inventive compositions including the modified conjugated diene-based rubber (including the specific nitrogen-containing functional group) and the SBR copolymerized with a carboxylic acid exhibited improved tensile strength and improved abrasion resistance while maintaining the balance between wet skid resistance and low hysteresis loss properties.

The invention claimed is:
1. A polymer composition comprising:
a polymer that comprises a plurality of anionic functional groups; and
a polymer that comprises a plurality of structures represented by formula (1),

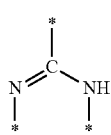

(1)

wherein * represents a site at which C or N is bonded to another atom, and
wherein the polymer that comprises a plurality of anionic functional groups comprises a structural unit derived from a conjugated diene compound.
2. The polymer composition according to claim 1, wherein the plurality of anionic functional groups are one or more anionic functional groups selected from the group consisting of a carboxyl group, a sulfo group, and a phosphoric acid group.

3. The polymer composition according to claim 1, wherein the polymer that comprises the plurality of structures represented by the formula (1) comprises a structural unit derived from a conjugated diene compound.

4. The polymer composition according to claim 3, wherein the polymer that comprises the plurality of structures represented by the formula (1) has a structure in which the structure represented by the formula (1) is bonded to a vinyl group comprised in the structural unit derived from the conjugated diene compound.

5. The polymer composition according to claim 3, wherein the polymer that comprises the plurality of structures represented by the formula (1) comprises a structural unit derived from an aromatic vinyl compound, and has a structure in which the structure represented by the formula (1) is bonded to a benzylic position of an aromatic ring comprised in the structural unit derived from the aromatic vinyl compound.

6. The polymer composition according to claim 1, further comprising silica and a crosslinking agent.

7. A crosslinked polymer obtained by crosslinking the polymer composition according to claim 6.

8. A tire, obtained by employing the crosslinked polymer according to claim 7 as at least either a tread material or a sidewall material.

9. The polymer composition according to claim 3, wherein the structure represented by the formula (1) is included in a group represented by formula (1-1),

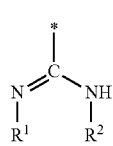

(1-1)

wherein $R^1$ and $R^2$ are independently represents a hydrocarbyl group or a group in which —$NR^3$— is inserted between two carbon atoms in a hydrocarbyl group, wherein $R^3$ is a hydrocarbyl group, and * represents a site at which C is bonded to a carbon atom included in the main chain of the polymer that comprises the plurality of structures represented by the formula (1), or is bonded to a linking group that is bonded to the main chain of the polymer that comprises the plurality of structures represented by the formula (1).

10. The polymer composition according to claim 9, wherein in the formula (1-1), $R^1$ and $R^2$ are independently represents a linear or branched alkyl group having 1 to 20 carbon atoms, a cycloalkyl group having 3 to 20 carbon atoms, an aryl group having 5 to 20 carbon atoms, or a group in which —$NR^3$— is inserted between two carbon atoms in a linear or branched alkyl group having 1 to 20 carbon atoms, a cycloalkyl group having 3 to 20 carbon atoms, or an aryl group having 5 to 20 carbon atoms, wherein $R^3$ is a linear or branched alkyl group having 1 to 6 carbon atoms, a cyclohexyl group, or a phenyl group.

11. The polymer composition according to claim 3, wherein a content of the structure represented by the formula (1) in the polymer that comprises the plurality of structures represented by the formula (1) is from 0.3 to 5 mol %, based on total structural units derived from monomers included in the polymer that comprises the plurality of structures represented by the formula (1).

12. The polymer composition according to claim 2, wherein the polymer that comprises the plurality of structures represented by the formula (1) comprises a structural unit derived from a conjugated diene compound.

13. The polymer composition according to claim 12, wherein the polymer that comprises the plurality of structures represented by the formula (1) has a structure in which the structure represented by the formula (1) is bonded to a vinyl group comprised in the structural unit derived from the conjugated diene compound.

14. The polymer composition according to claim 12 wherein the polymer that comprises the plurality of structures represented by the formula (1) comprises a structural unit derived from an aromatic vinyl compound, and has a structure in which the structure represented by the formula (1) is bonded to a benzylic position of an aromatic ring comprised in the structural unit derived from the aromatic vinyl compound.

15. The polymer composition according to claim 2, further comprising silica and a crosslinking agent.

16. A crosslinked polymer obtained by crosslinking the polymer composition according to claim 15.

17. A tire, obtained by employing the crosslinked polymer according to claim 16 as at least either a tread material or a sidewall material.

18. The polymer composition according to claim 12, wherein the structure represented by the formula (1) is included in a group represented by formula (1-1),

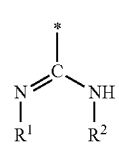

(1-1)

wherein $R^1$ and $R^2$ are independently represents a hydrocarbyl group or a group in which —$NR^3$— is inserted between two carbon atoms in a hydrocarbyl group, wherein $R^3$ is a hydrocarbyl group, and * represents a site at which C is bonded to a carbon atom included in the main chain of the polymer that comprises the plurality of structures represented by the formula (1), or is bonded to a linking group that is bonded to the main chain of the polymer that comprises the plurality of structures represented by the formula (1).

19. The polymer composition according to claim 18, wherein in the formula (1-1), $R^1$ and $R^2$ are independently represents a linear or branched alkyl group having 1 to 20 carbon atoms, a cycloalkyl group having 3 to 20 carbon atoms, an aryl group having 5 to 20 carbon atoms, or a group in which —$NR^3$— is inserted between two carbon atoms in a linear or branched alkyl group having 1 to 20 carbon atoms, a cycloalkyl group having 3 to 20 carbon atoms, or an aryl group having 5 to 20 carbon atoms, wherein $R^3$ is a linear or branched alkyl group having 1 to 6 carbon atoms, a cyclohexyl group, or a phenyl group.

20. The polymer composition according to claim 12, wherein a content of the structure represented by the formula (1) in the polymer that comprises the plurality of structures represented by the formula (1) is from 0.3 to 5 mol %, based on total structural units derived from monomers included in the polymer that comprises the plurality of structures represented by the formula (1).

* * * * *